(12) United States Patent
Sato

(10) Patent No.: US 7,083,872 B2
(45) Date of Patent: Aug. 1, 2006

(54) MAGNETIC RECORDING MEDIUM HAVING GOOD IN-PLANE ORIENTATION

(75) Inventor: Kenji Sato, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/791,068

(22) Filed: Mar. 2, 2004

(65) Prior Publication Data
US 2005/0079388 A1    Apr. 14, 2005

(30) Foreign Application Priority Data
Oct. 10, 2003    (JP)    ............... 2003-352200

(51) Int. Cl.
*G11B 5/66*    (2006.01)
*G11B 5/70*    (2006.01)

(52) U.S. Cl. .................................. 428/831.2

(58) Field of Classification Search .......... 428/694 TS, 428/611, 668, 900, 831.2, 831
See application file for complete search history.

(56) References Cited

U.S. PATENT DOCUMENTS

2003/0228496 A1* 12/2003 Fujimaki et al. ...... 428/694 TC
2004/0115481 A1* 6/2004 Pelhos et al. ............ 428/694 T

FOREIGN PATENT DOCUMENTS

| JP | 58-128023 | 7/1983 |
|----|-----------|--------|
| JP | 8-007250 | 1/1996 |
| JP | 2002-203312 | 7/2002 |

OTHER PUBLICATIONS

Tanahashi et al, "MAgnetic anisotropy and microstructure of obliquely evaporated Co/Cr thin films", 1996, J. Magn. Mag. Matl., vol. 153, No. 3, pp. 265-272.*

* cited by examiner

*Primary Examiner*—Holly Rickman
(74) *Attorney, Agent, or Firm*—Greer, Burns & Crain, Ltd.

(57) ABSTRACT

A magnetic recording medium including a substrate, a first seed layer provided on the substrate, a second seed layer provided on the first seed layer and formed of the same material as that of the first seed layer, and a plurality of crystal layers provided on the second seed layer and including a magnetic recording layer. A normal to a crystal lattice plane preferentially oriented in a given direction in each grain composing one of the first and second seed layers is inclined from a normal to the upper surface of the substrate.

7 Claims, 8 Drawing Sheets

MAGNETIC RECORDING MEDIUM HAVING GOOD IN-PLANE ORIENTATION

BACKGROUND OF THE INVENTION

1. Field of the Invention

The present invention relates to a magnetic recording medium and a magnetic recording/reproducing device using the magnetic recording medium.

2. Description of the Related Art

Conventionally, a metallic substrate formed of aluminum alloy or the like is often used as a substrate for a magnetic recording medium. The surface of the metallic substrate is usually textured. Such texturing is a process of forming irregularities along a given direction (usually, along a circumferential direction) on the substrate surface. By performing the texturing, a magnetic film formed on the substrate can be made to have magnetic anisotropy in the circumferential direction, thereby improving magnetic characteristics such as thermal fluctuation resistance and resolution.

In recent years, a nonmetallic substrate formed of glass, ceramic, etc. has been widely used in place of the metallic substrate of aluminum or the like as the substrate for the magnetic recording medium. The nonmetallic substrate has high hardness, so that the medium is hard to be bruised. Furthermore, the nonmetallic substrate has an advantage in glide height characteristic owing to its high surface smoothness. However, it is difficult to sufficiently texture the surface of the nonmetallic substrate such as a glass substrate.

In view of the above problem, it is desirable to improve the magnetic anisotropy of a magnetic film formed on the nonmetallic substrate such as a glass substrate without texturing the substrate surface. A technique of forming an obliquely grown crystal layer on the surface of a nonmetallic substrate has been proposed in Japanese Patent Laid-open No. 2002-203312. In forming the obliquely grown crystal layer, grains grow in a direction inclined from a normal to the substrate surface. Magnetic crystal layers are formed as multiple layers on the upper surface of the obliquely grown crystal layer. According to a magnetic recording medium adopting the obliquely grown crystal layer, the magnetic anisotropy in the circumferential direction of the medium can be improved in the upper magnetic crystal layer. However, a relatively long time is required for the formation of the obliquely grown crystal layer by using a sputtering device, resulting in low productivity.

SUMMARY OF THE INVENTION

It is therefore an object of the present invention to provide a magnetic recording medium which can improve the in-plane crystallographic orientation and the circumferential magnetic anisotropy of a magnetic recording layer.

In accordance with an aspect of the present invention, there is provided a magnetic recording medium including a substrate; a first seed layer provided on the substrate; a second seed layer provided on the first seed layer, the second seed layer being formed of the same material as that of the first seed layer; and a plurality of crystal layers provided on the second seed layer and including a magnetic recording layer; wherein a normal to a crystal lattice plane preferentially oriented in a given direction in each grain composing one of the first and second seed layers is inclined from a normal to the upper surface of the substrate.

Preferably, the substrate is disk-shaped; and the normal to the crystal lattice plane in each grain composing one of the first and second seed layers is inclined in a perpendicular plane containing a straight line passing through the center of the substrate. The crystal lattice plane in each grain composing one of the first and second seed layers is inclined from the center of the substrate toward the outer circumference thereof. Preferably, one of the first and second seed layers is formed by an oblique incidence sputtering process. Each of the first and second seed layers has a B2 structure, and is formed of alloy containing Al and Ru, for example.

In the magnetic recording medium according to the present invention, the crystal lattice plane in each grain composing one of the first and second seed layers is inclined. Accordingly, a groove is formed between the grains adjacent to each other in the radial direction of the substrate is formed on the upper surface of one of the first and second seed layers. The crystal layers are formed on the upper surface of this seed layer on the basis of epitaxial growth, and the easy axis of magnetization in the magnetic layer included in the crystal layers is ordered in the circumferential direction of the disk-shaped medium. Accordingly, although the upper surface of the substrate is not mechanically textured, the magnetic anisotropy of the magnetic layer can be improved. Further, also in the case that the upper surface of the substrate is textured, it has been confirmed that the effect by the oblique incidence sputter process can be obtained.

Further, by adopting a normal sputter process, that is, any sputter process other than the oblique incidence sputter process for the deposition of the other of the first and second seed layers and optimizing the thickness of the seed layer to be formed by the oblique incidence sputter process, it is possible to obtain a magnetic recording medium having both good in-plane orientation and high orientation ratio (Hcc/Hcr). That is, the problem of difference between a seed layer thickness range which can provide good in-plane orientation and a seed layer thickness range which can provide high Hcc/Hcr has been solved by the deposition processes for the first and second seed layers according to the present invention.

In a magnetic recording medium using a substrate such as a glass substrate having a difficulty of surface texturing, both good in-plane orientation and high orientation ratio (Hcc/Hcr) can be obtained.

In the orientation ratio (Hcc/Hcr), Hcc is the coercive force in the circumferential direction of the disk-shaped magnetic recording medium, and Hcr is the coercive force in the radial direction of the disk-shaped magnetic recording medium. A plurality of divided seed layers are formed, and one of these seed layers is formed by an oblique incidence sputter process. Accordingly, the productivity can be improved as optimizing the thickness of this seed layer formed by the oblique incidence sputter process.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
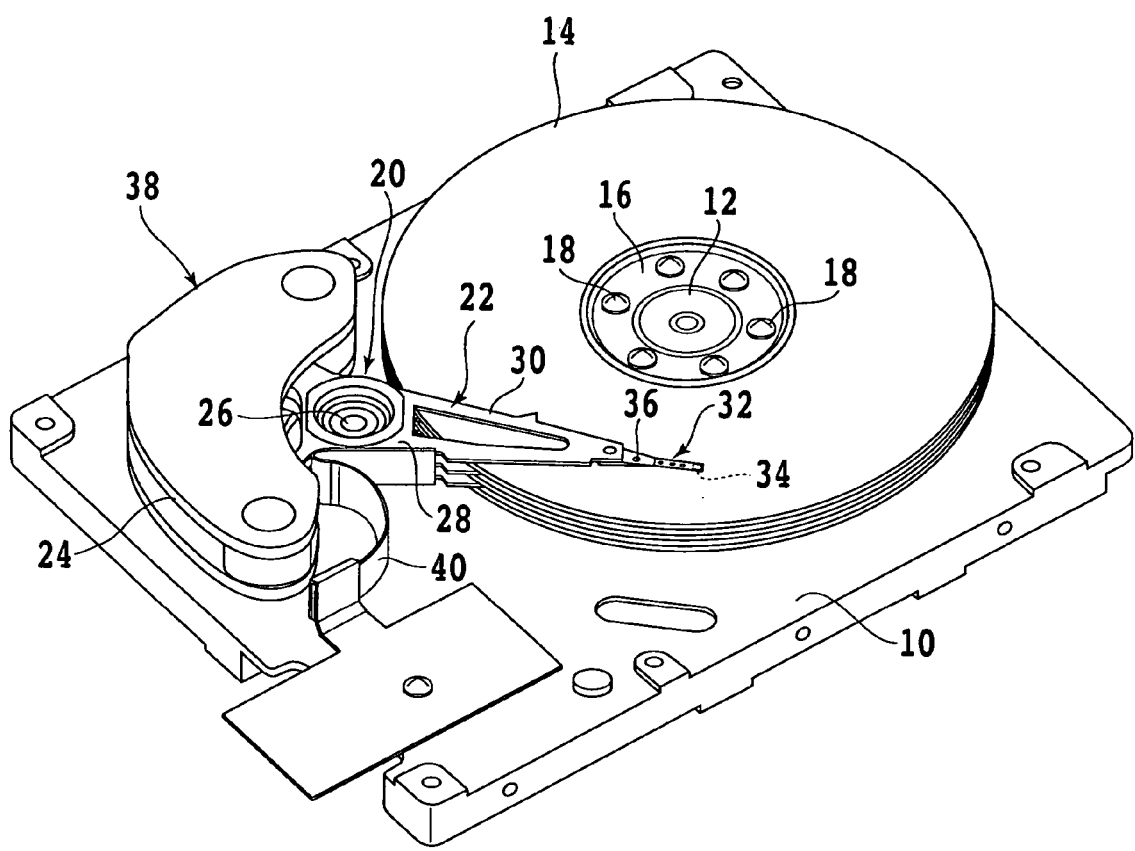
FIG. 1 is a perspective view of a magnetic disk drive in the condition where a cover is removed.

Referring to FIG. 1, there is shown a perspective view of a magnetic disk drive in the condition where a cover is removed. A shaft 12 is fixed to a base 10, and a spindle hub (not shown) is rotatably mounted on the shaft 12. The spindle hub is driven by a DC motor (not shown) to rotate about the shaft 12. A plurality of magnetic disks 14 and spacers (not shown) are mounted on the spindle hub so as to be alternately stacked. Each magnetic disk 14 has a specific medium configuration to be hereinafter described. That is, the plural magnetic disks 14 are fixedly mounted on the spindle hub by securing a disk clamp 16 to the spindle hub by means of a plurality of screws 18, and are equally spaced a given distance by the spacers.

Reference numeral 20 denotes a rotary actuator including an actuator arm assembly 22 and a magnetic circuit 24. The actuator arm assembly 22 is rotatable about a shaft 26 fixed to the base 10. The actuator arm assembly 22 includes an actuator block 28 rotatably mounted on the shaft 26 through a pair of bearings (not shown), a plurality of actuator arms 30 extending horizontally from the actuator block 28 in one direction, and a head assembly 32 fixed to a front end portion of each actuator arm 30.

Each head assembly 32 includes a head slider 34 having an electromagnetic transducer (magnetic head element) for reading/writing data from/to the corresponding magnetic disk 14, and a suspension 36 having a front end portion supporting the head slider 34 and a base end portion fixed to the corresponding actuator arm 30. A coil (not shown) is supported on the opposite side of the actuator arms 30 with respect to the shaft 26. The coil is inserted in a gap of the magnetic circuit 24. The magnetic circuit 24 and the coil constitute a voice coil motor (VCM) 38.

Reference numeral 40 denotes a flexible printed circuit board (FPC) for supplying a write signal to the electromagnetic transducer and for taking out a read signal from the electromagnetic transducer. One end of the flexible printed circuit board 40 is fixed to a side surface of the actuator block 28, and the other end is connected to a main printed wiring board mounted on the back surface of the base 10.

Figure 2:
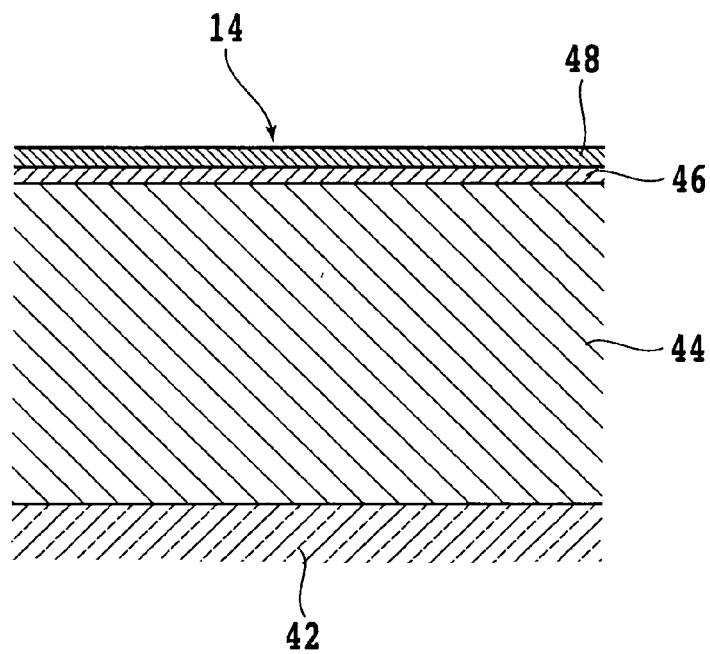
FIG. 2 is a schematic sectional view of a magnetic recording medium according to a preferred embodiment of the present invention.

FIG. 2 schematically shows a sectional structure of each magnetic disk 14. The magnetic disk 14 includes a nonmetallic substrate 42 as a basis and a polycrystalline structure film 44 formed on the nonmetallic substrate 42. The nonmetallic substrate 42 is formed of glass, for example. The nonmetallic substrate 42 may be formed of any other nonmetallic materials such as ceramic, silicon, and sapphire. The upper surface of the nonmetallic substrate 42 is a smoothed surface. Magnetic information is recorded in the polycrystalline structure film 44. A protective film 46 is formed on the upper surface of the polycrystalline structure film 44. The protective film 46 is formed of diamond-like carbon (DLC), for example. The protective film 46 is covered with a lubricating film 48 formed of perfluoropolyether (PFPE), for example.

Figure 3:
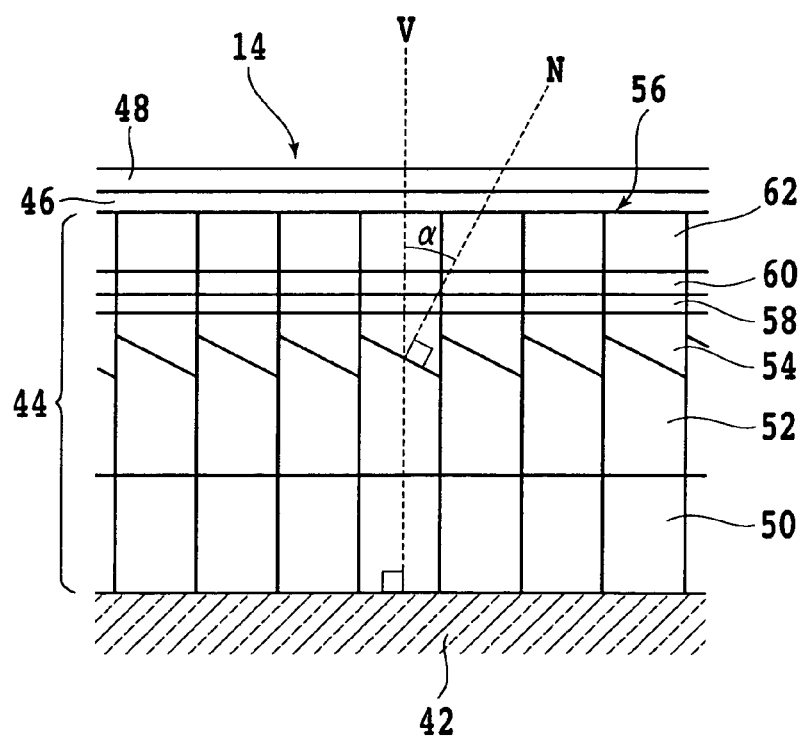
FIG. 3 is a detailed sectional view of the magnetic recording medium according to the preferred embodiment.

Referring to FIG. 3, there is shown a detailed structure of the polycrystalline structure film 44. The polycrystalline structure film 44 includes a first seed layer 50 formed on the nonmetallic substrate 42, a second seed layer 52 formed on the first seed layer 50, a third seed layer 54 formed on the second seed layer 52, and a multilayer crystal layer 56 formed on the third seed layer 54. The first seed layer 50 is formed of alloy containing Cr and Ti, for example. In this preferred embodiment, a CrTi film having a thickness of about 25 nm is used as the first seed layer 50.

The second seed layer 52 and the third seed layer 54 are formed of alloy containing Al and Ru, for example. In this preferred embodiment, AlRu films having a total thickness of about 25 nm are used as the second and third seed layers 52 and 54. The second seed layer 52 is composed of grains growing in a vertical direction V perpendicular to the upper surface of the substrate 42. On the other hand, the third seed layer 54 is composed of grains growing in a direction inclined from the vertical direction V by a given angle $\alpha$. That is, a normal N perpendicular to a given crystal lattice plane of each grain in the third seed layer 54 is inclined from the vertical direction V toward the outer circumference of the magnetic disk 14 by the given angle $\alpha$. The given crystal lattice plane is preferentially oriented in a given direction.

The multilayer crystal layer 56 includes a base layer 58 formed on the third seed layer 54. The base layer 58 is composed of grains having a bcc (body-centered cubic) structure. The base layer 58 is formed of Cr or alloy containing Cr, for example. In this preferred embodiment, a CrMo film having a thickness of about 4 nm is used as the base layer 58. An intermediate layer 60 is formed on the base layer 58. The intermediate layer 60 is composed of grains having an hcp (hexagonal close-packed) structure. The intermediate layer 60 is formed of alloy containing Co, for example. In this preferred embodiment, a CoCrTa film having a thickness of about 1 nm is used as the intermediate layer 60.

A magnetic recording layer 62 is formed on the intermediate layer 60. Magnetic information is recorded in the magnetic recording layer 62. The magnetic recording layer 62 is composed of grains having an hcp structure. The magnetic recording layer 62 is formed of alloy containing Co, for example. In this preferred embodiment, a CoCrPt-BCu film having a thickness of about 15 nm is used as the magnetic recording layer 62. According to this polycrystalline structure film 44, the easy axis of magnetization in the magnetic recording layer 62 can be ordered in the circumferential direction by the operation of the third seed layer 54 even though the upper surface of the nonmetallic substrate 42 is not mechanically textured.

The second seed layer 52 is formed by a normal (perpendicular incidence) sputter process, and the third seed layer 54 is formed by an oblique incidence sputter process to optimize the film thickness of the third seed layer 54, thereby obtaining the magnetic disk 14 having both good in-plane crystallographic orientation and high orientation ratio (Hcc/Hcr) where Hcc is the coercive force in the circumferential direction of the magnetic disk 14 and Hcr is the coercive force in the radial direction of the magnetic disk 14.

A manufacturing method for the magnetic disk 14 will now be described with reference to FIGS. 4 to 11. First, the disk-shaped glass substrate 42 is prepared and the upper surface of the substrate 42 is smoothed. The substrate 42 is mounted in a magnetron sputtering device, for example. In mounting, the substrate 42 is heated to 220° C. by a carbon heater. In the magnetron sputtering device, the polycrystalline structure film 44 is formed on the upper surface of the substrate 42 by a method to be hereinafter described in detail. Thereafter, the protective film 46 is formed on the upper surface of the polycrystalline structure film 44 by a CVD (chemical vapor deposition) process. The lubricating film 48 is next coated on the upper surface of the protective film 46. This coating of the lubricating film 48 may be performed by immersing the substrate 42 into a liquid containing perfluoropolyether, for example.

Figure 4:
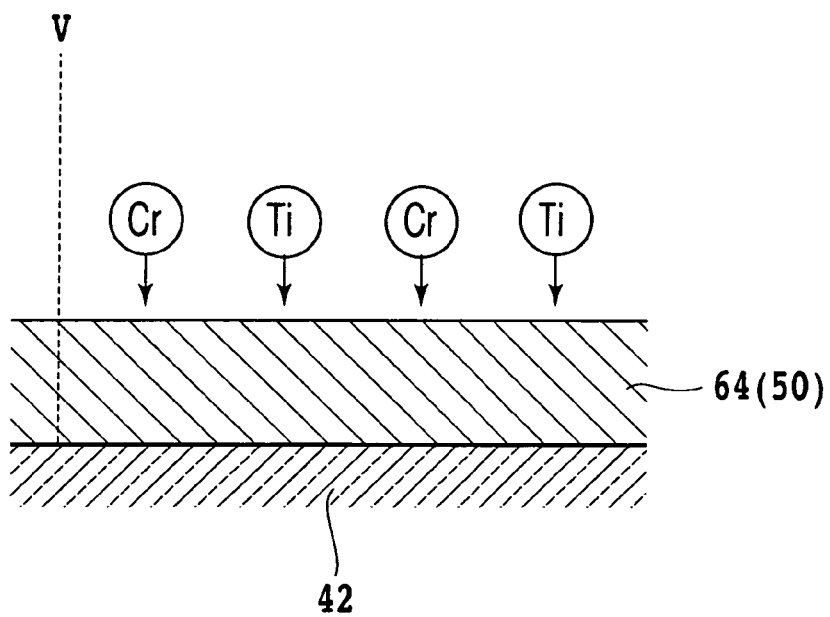
FIG. 4 is a sectional view conceptually showing a deposition process for a first seed layer.

A manufacturing method for the polycrystalline structure film 44 will now be described in detail. As shown in FIG. 4, a CrTi film 64 as the first seed layer 50 is formed on the upper surface of the glass substrate 42 by a perpendicular incidence sputtering process. In performing this sputtering, a CrTi target is mounted in the sputtering device. Cr atoms and Ti atoms are ejected from the CrTi target, and land on the upper surface of the substrate 42 in the vertical direction V. In other words, the incident angle is set to 0°. Thus, the amorphous CrTi film 64 is formed on the upper surface of the substrate 42. The CrTi film 64 contains 50 at % of Cr and 50 at % of Ti.

Figure 5:
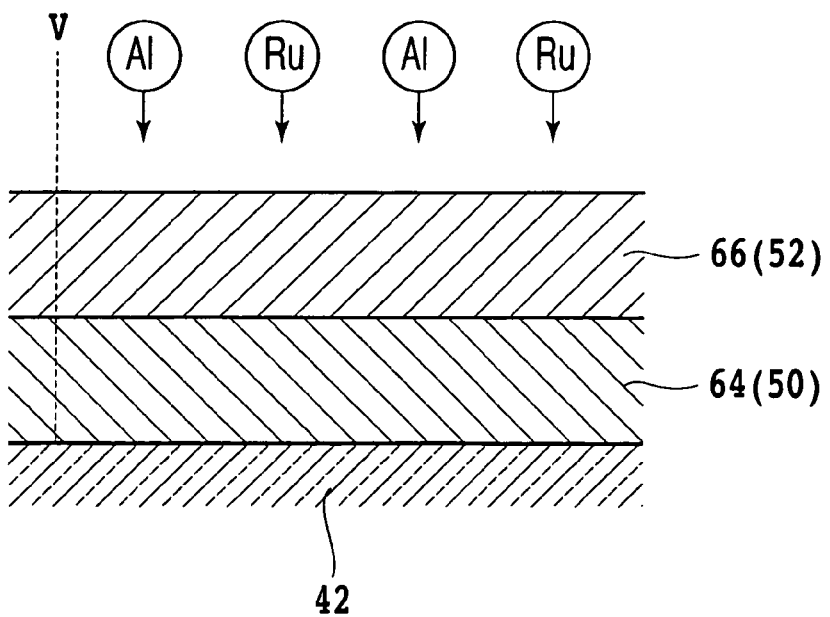
FIG. 5 is a sectional view conceptually showing a deposition process for a second seed layer.

As shown in FIG. 5, an AlRu film 66 as the second seed layer 52 is formed on the upper surface of the CrTi film 64 by a perpendicular incidence sputtering process. In performing this sputtering, an AlRu target is mounted in the sputtering device, and Ar gas is introduced into a chamber of the sputtering device. The pressure of the Ar gas in the chamber is set to about 0.67 Pa.

Figure 6:
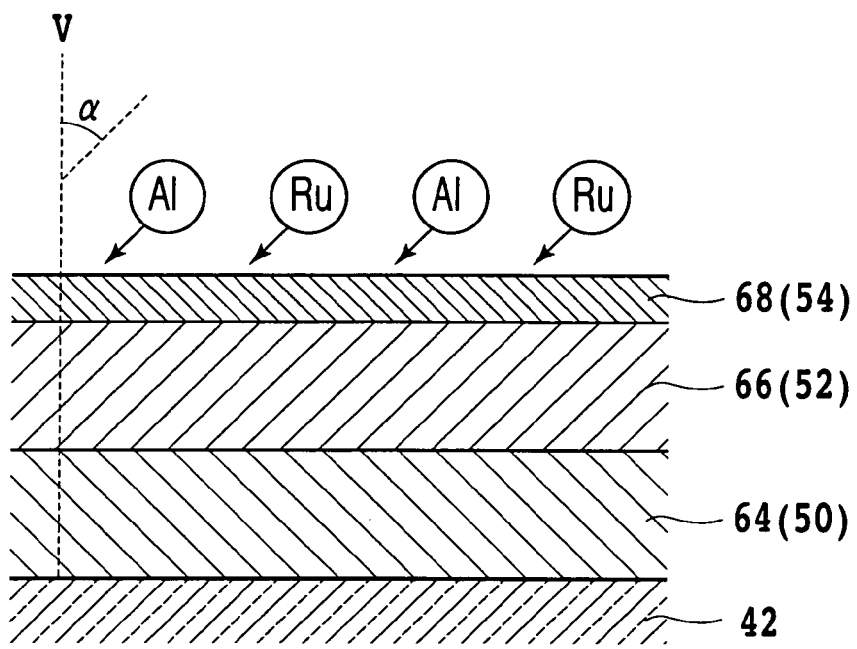
FIG. 6 is a sectional view conceptually showing a deposition process for a third seed layer.

As shown in FIG. 6, an AlRu film 68 as the third seed layer 54 is formed on the upper surface of the second seed layer 52 by an oblique incidence sputtering process. In forming the third seed layer 54, Al atoms and Ru atoms are ejected from the AlRu target, and land on the upper surface of the second seed layer 52 in a direction inclined from the vertical direction V by the given angle $\alpha$. In other words, the Al atoms and the Ru atoms land on the upper surface of the second seed layer 52 in an oblique direction from the outer circumference of the substrate 42 toward the center thereof. Thus, the third seed layer 54 (the AlRu film 68) is formed on the upper surface of the second seed layer 52 (the AlRu film 66). Each of the AlRu films 66 and 68 contains 50 at % of Al and 50 at % of Ru.

Figure 7:
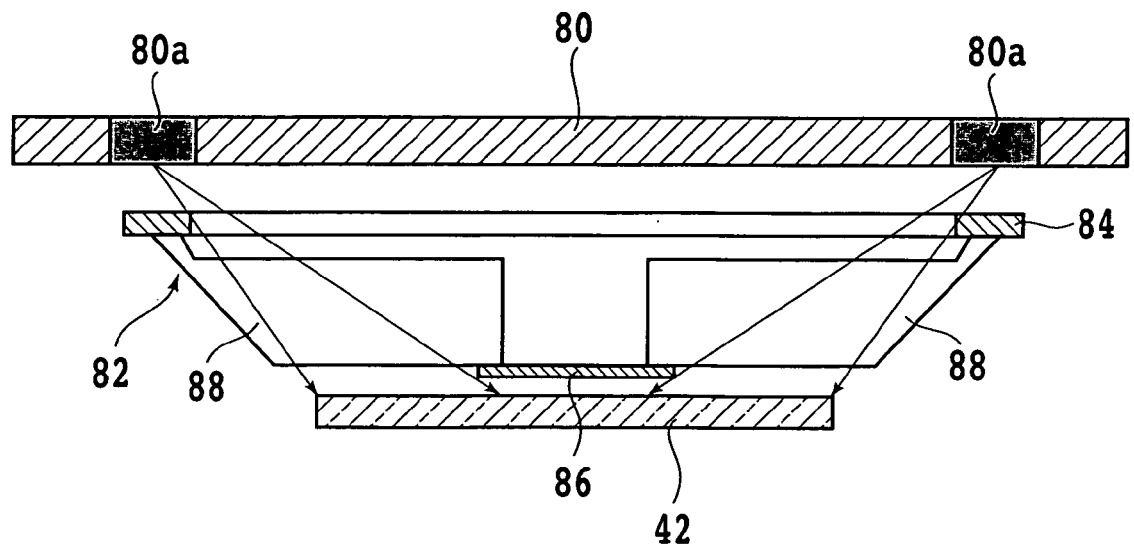
FIG. 7 is a sectional view showing the arrangement of a target, a shield, and a glass substrate used in the deposition process for the third seed layer.
Figure 8:
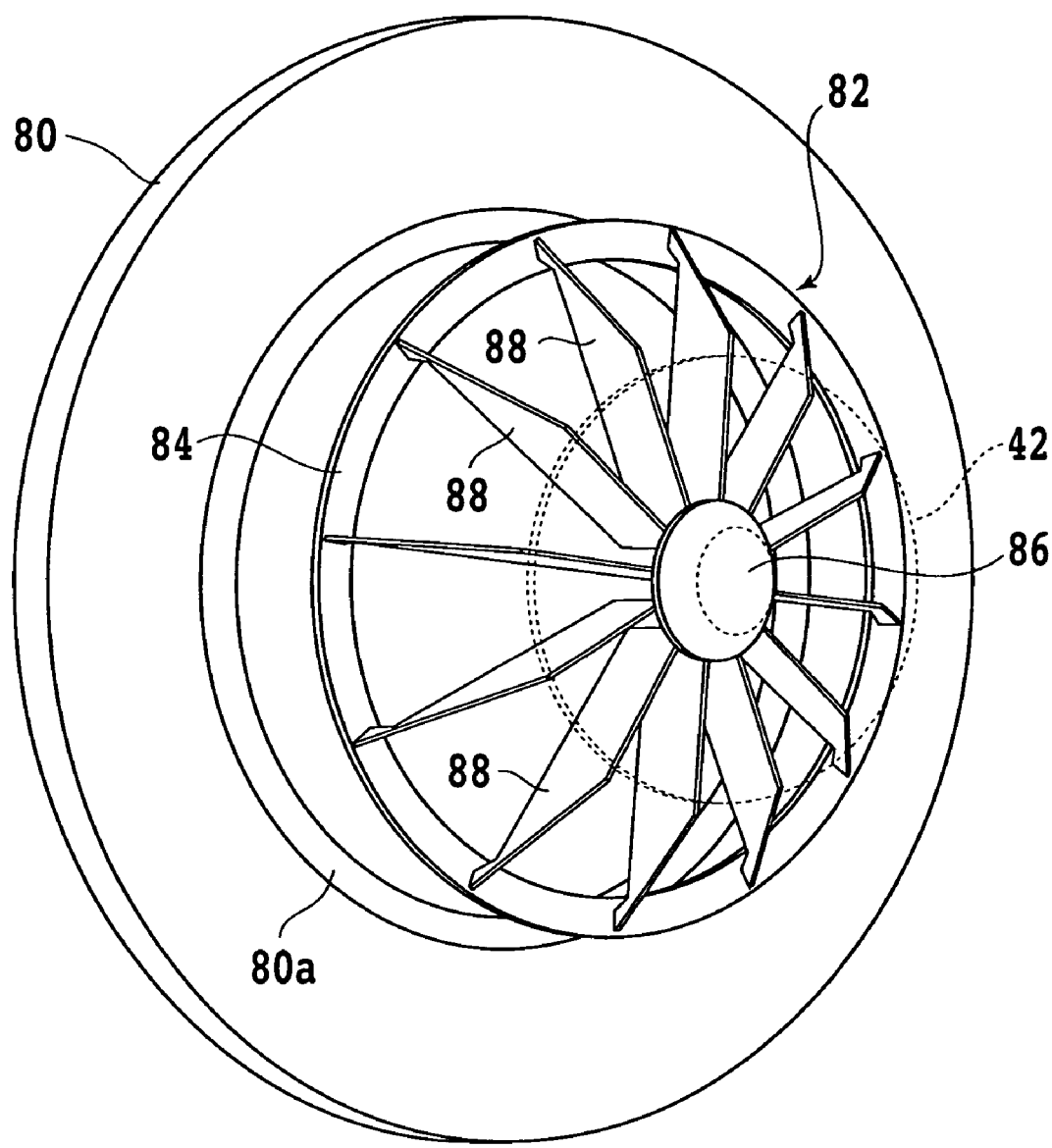
FIG. 8 is a perspective view showing the arrangement of a target, a shield, and a glass substrate used in the deposition process for the third seed layer.

As shown in FIG. 8, the AlRu target is denoted by reference numeral 80 as having a doughnut-shaped configuration, for example. FIG. 7 is a sectional view of FIG. 8. The diameter of the AlRu target 80 is set larger than that of the substrate 42. As shown in FIG. 7, the AlRu target 80 has an erosion position 80a set radially outside of the outer circumference of the substrate 42. Al atoms and Ru atoms are ejected from the erosion position 80a according to the supply of a current and incident on the substrate 42 obliquely from the outer circumference of the substrate 42 toward the center thereof.

A shield 82 is interposed between the AlRu target 80 and the substrate 42. The shield 82 is configured by connecting a plurality of circumferentially spaced shielding plates 88 between an annular plate 84 and a boss 86. The shield 82 is located with respect to the substrate 42 so that each shielding plate 88 stands perpendicularly to the upper surface of the substrate 42. In forming the third seed layer 54, or the AlRu film 68, the shield 82 is rotated at a low speed of 60 rpm, for example.

By the provision of the shielding plates 88, the direction of incidence of the atoms is limited to a substantially radial direction of the substrate 42, and the atoms ejected from the erosion position 80a of the AlRu target 80 and passing through the shielding plates 88 can be eliminated by the shielding plates 88. By ensuring a sufficient space for the flight path of the atoms between the AlRu target 80 and the substrate 42, sufficient amounts of Al atoms and Ru atoms can be made to arrive at the substrate 42. The grains in the AlRu film 68 obliquely grow on the substrate 42 in a direction inclined from the vertical direction V by the given angle $\alpha$.

In each grain in the third seed layer 54, the normal N to the crystal lattice plane preferentially oriented in a given direction is inclined from the vertical direction V by the given angle $\alpha$ as shown in FIG. 3. This angle $\alpha$ is preferably set in the range of 45° to 70°. The flight path of the Al atoms and the Ru atoms is limited by the shielding plates 88 of the shield 82, so that the normal N to the crystal lattice plane of each grain composing the AlRu film 68 is inclined from the center of the substrate 42 toward the outer circumference thereof in a perpendicular plane containing a straight line passing through the center of the substrate 42. Since the shield 82 is rotated at a low speed, the Al atoms and the Ru atoms are uniformly deposited on the substrate 42.

Figure 9:
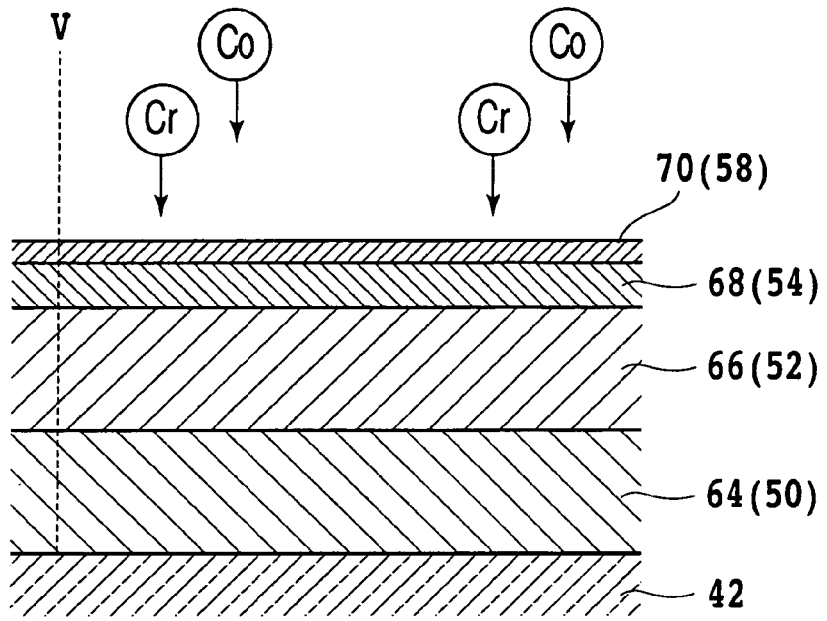
FIG. 9 is a sectional view conceptually showing a deposition process for a base layer.

As shown in FIG. 9, a CoCr film 70 as the base layer 58 is formed on the upper surface of the AlRu film 68 by a perpendicular incidence sputtering process. In performing this sputtering, a CoCr target is mounted in the sputtering device. Co atoms and Cr atoms ejected from the CoCr target vertically land on the upper surface of the AlRu film 68. Thus, the CoCr film 70 is formed on the upper surface of the AlRu film 68. The CoCr film 70 contains 58 at % of Co and 42 at % of Cr. The CoCr film 70 is composed of grains having an hcp structure.

Figure 10:
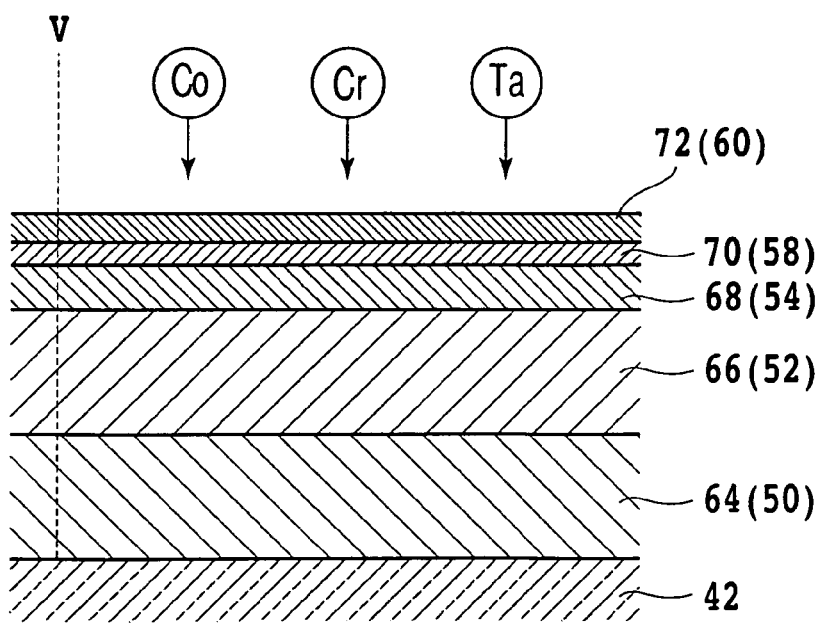
FIG. 10 is a sectional view conceptually showing a deposition process for an intermediate layer.

As shown in FIG. 10, a CoCrTa film 72 as the intermediate layer 60 is formed on the upper surface of the CoCr film 70 by a perpendicular incidence sputtering process. In performing this sputtering, a CoCrTa target is mounted in the sputtering device. Co atoms, Cr atoms, and Ta atoms ejected from the CoCrTa target vertically land on the upper surface of the CoCr film 70 to form the CoCrTa film 72. The CoCrTa film 72 is composed of grains having an hcp structure.

Figure 11:
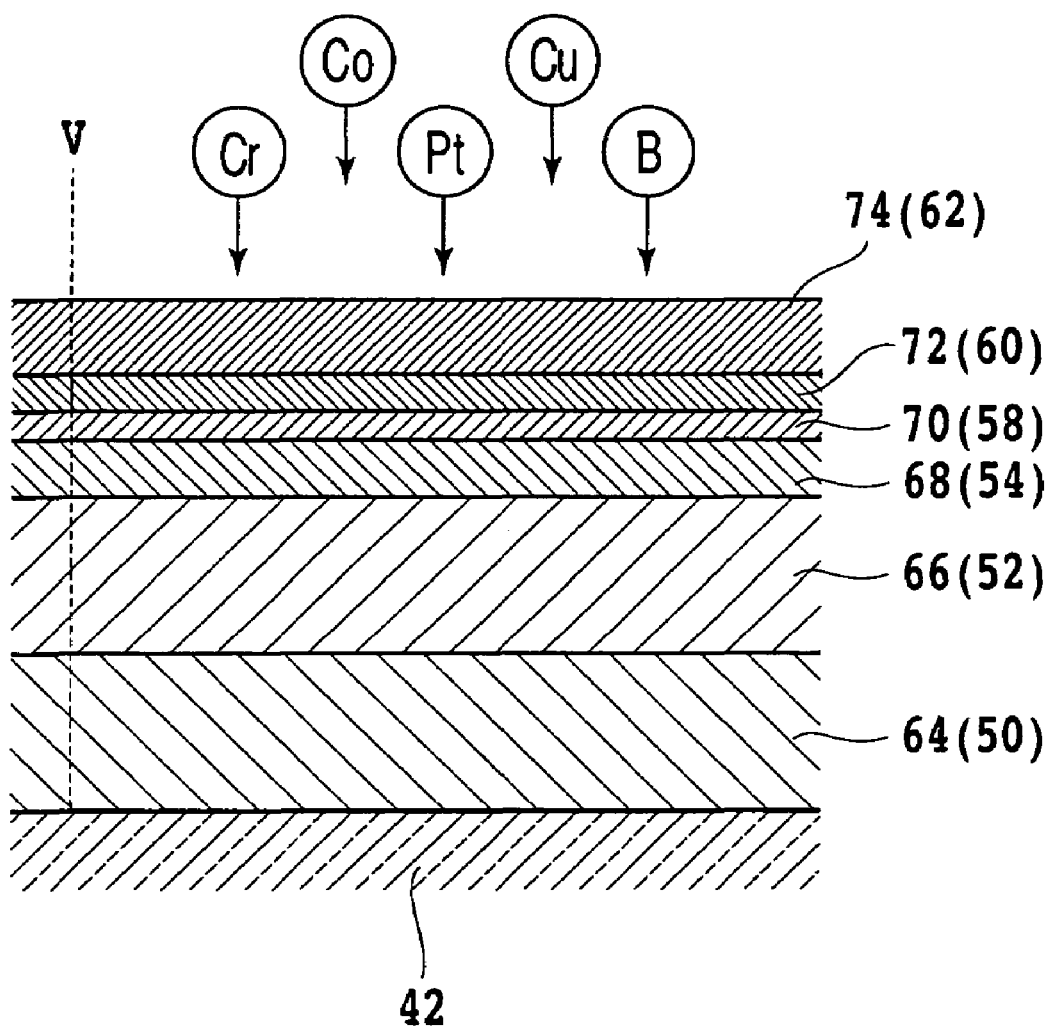
FIG. 11 is a sectional view conceptually showing a deposition process for a magnetic recording layer.

As shown in FIG. 11, a CoCrPtBCu film 74 as the magnetic recording layer 62 is formed on the upper surface of the CoCrTa film 72 by a perpendicular incidence sputtering process. In performing this sputtering, a CoCrPtBCu target is mounted in the sputtering device. Co atoms, Cr atoms, Pt atoms, B atoms, and Cu atoms ejected from the CoCrPtBCu target vertically land on the upper surface of the CoCrTa film 72. Thus, the CoCrPtBCu film 74 is formed on the upper surface of the CoCrTa film 72. The CoCrPtBCu film 74 contains 58 at % of Co, 19 at % of Cr, 12 at % of Pt, 7 at % of B, and 4 at % of Cu. The CoCrPtBCu film 74 is composed of grains having an hcp structure.

According to the manufacturing method mentioned above, a groove is formed between the grains adjacent to each other in the radial direction of the substrate 42 on the upper surface of the third seed layer 54, or the AlRu film 68. The CoCr film 70, the CoCrTa film 72, and the CoCrPtBCu film 74 are formed on the basis of epitaxial growth on the upper surface of the AlRu film 68. During this growth, the easy axis of magnetization in the CoCrPtBCu film 74, or the magnetic recording layer 62 can be ordered in the circumferential direction of the substrate 42. Although the upper surface of the substrate 42 is not textured, the magnetic anisotropy of the magnetic recording layer 62 can be improved to thereby improve the magnetic characteristics of the magnetic disk 14. However, also in the case that the upper surface of the substrate 42 is textured, the magnetic characteristics can be improved by the oblique incidence sputtering process.

The present inventor observed cross sections of the third seed layer 54, or the AlRu film 68 by using a transmission electron microscope (TEM). On the basis of the manufacturing method mentioned above, the CrTi film 64 having a thickness of about 25 nm was formed on the upper surface of the disk-shaped glass substrate 42. Next, the AlRu film 68 having a thickness of about 100 nm was formed on the upper surface of the CrTi film 64 by the oblique incidence sputtering process. As the cross sections of the AlRu film 68, a cross section taken in the radial direction of the substrate 42 and a cross section taken in the circumferential direction of the substrate 42 were observed. It was confirmed that the grains in the AlRu film 68 grew in a direction inclined from the vertical direction perpendicular to the upper surface of the substrate 42 by a given angle. Furthermore, it was confirmed that the normal to a given crystal lattice plane of each grain was inclined from the vertical direction in a perpendicular plane containing a straight line passing through the center of the substrate 42.

The present inventor further observed the third seed layer 54, or the AlRu film 68 on the basis of X-ray diffraction. A rocking curve was measured on the (100) face of each grain. As similar to the manufacturing method mentioned above, the CrTi film 64 having a thickness of about 25 nm was formed on the upper surface of the disk-shaped glass substrate 42, and the AlRu film 68 having a thickness of about 100 nm was formed on the CrTi film 64 by the oblique incidence sputtering process. Further, a comparison was prepared by a similar manufacturing method except that the AlRu film 68 was formed by the perpendicular incidence sputtering process.

Figure 12:
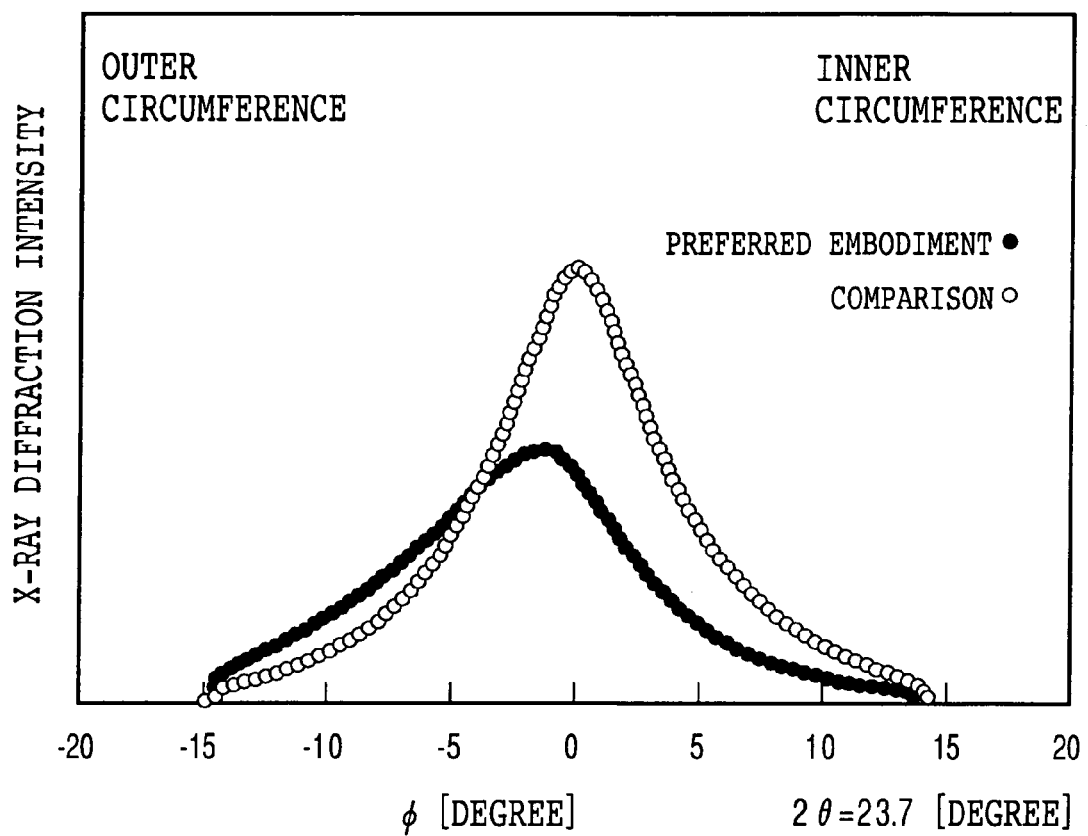
FIG. 12 is a graph showing a verification result obtained on the basis of X-ray diffraction.

X-rays were directed onto the surface of the substrate 42 in an oblique direction from the outer circumference of the substrate 42 toward the center thereof. On each grain in the AlRu film 68, the angle of inclination of the normal to the crystal lattice plane with respect to the vertical direction perpendicular to the upper surface of the substrate 42 was measured. As a result, a peak on the (100) face was confirmed at a point shifted toward the outer circumference of the substrate 42 in the AlRu film 68 according to the present invention as shown in FIG. 12. In other words, it was confirmed that the normal to the crystal lattice plane was inclined toward the outer circumference of the substrate 42 in almost all of the grains in the AlRu film 68 according to the present invention. To the contrary, a peak on the (100) face in the AlRu film 68 of the comparison was confirmed at a point corresponding to an inclination angle of 0°. In other words, it was confirmed that the normal to the crystal lattice plane was substantially parallel to the vertical direction perpendicular to the upper surface of the substrate 42 in almost all of the grains in the AlRu film 68 of the comparison.

Further, the present inventor verified the coercive force in the magnetic recording layer 62 in the circumferential direction of the magnetic disk 14. In making this verification, an example according to the present invention was prepared according to the manufacturing method mentioned above. Further, plural different comparisons were similarly prepared. In each of these comparisons, any one of the second seed layer 52 and the third seed layer 54 was omitted. The coercive force Hcc was measured in the circumferential direction of the magnetic disk 14. The results of this measurement are shown in Table 1. As apparent from Table 1, it was confirmed that the coercive force Hcc in Example according to the present invention was substantially equal to the coercive force Hcc in Comparison 1 wherein the thickness of the third seed layer (AlRu film) is equal to the total thickness of the second and third seed layers (AlRu films) in Example.

TABLE 1

|  | THICKNESS OF THE SECOND SEED LAYER (nm) | THICKNESS OF THE THIRD SEED LAYER (nm) | Hcc (Oe) | Hcc/ Hcr |
|---|---|---|---|---|
| COMPARISON 1 | 0 | 20 | 4532 | 1.07 |
| COMPARISON 2 | 10 | 0 | 3929 | 1.00 |
| COMPARISON 3 | 0 | 10 | 4051 | 1.11 |
| EXAMPLE | 10 | 10 | 4506 | 1.10 |

Further, the present inventor verified the magnetic anisotropy of the magnetic recording layer 62. The coercive force Hcc was measured in the circumferential direction of the magnetic disk 14. At the same time, the coercive force Hcr was measured in the radial direction of the magnetic disk 14. The results of this measurement are also shown in Table 1. As apparent from Table 1, it was confirmed that the orientation ratio (Hcc/Hcr) in Example according to the present invention was substantially equal to that in Comparison 3, thus exhibiting sufficient magnetic anisotropy.

The present invention is not limited to the details of the above described preferred embodiments. The inventor also confirmed that the same effect as the above embodiments could be obtained by applying the oblique sputter process to the second seed layer instead of the third layer. The scope of the invention is defined by the appended claims and all changes and modifications as fall within the equivalence of the scope of the claims are therefore to be embraced by the invention.

What is claimed is:

1. A magnetic recording medium comprising:

a substrate;

a first seed layer provided on said substrate, said first seed layer being composed of grains growing in a first direction;

a second seed layer provided on said first seed layer, said second seed layer being formed of the same composition of materials as that of said first seed layer, said second seed layer being composed of grains growing in a second direction tilted with respect to the first direction; and a plurality of crystal layers provided on said second seed layer and including a magnetic recording layer;

wherein a normal to a crystal lattice plane preferentially oriented in a given direction in each grain composing one of said first and second seed layers is inclined from a normal to the upper surface of said substrate.

2. The magnetic recording medium according to claim 1, wherein:
said substrate is disk-shaped; and
said normal to said crystal lattice plane in each grain composing one of said first and second seed layers is inclined in a perpendicular plane containing a straight line passing through the center of said substrate.

3. The magnetic recording medium according to claim 2, wherein said crystal lattice plane in each grain composing one of said first and second seed layers is inclined from the center of said substrate toward the outer circumference thereof.

4. The magnetic recording medium according to claim 1, wherein one of said first and second seed layers is formed by an oblique incidence sputtering process.

5. The magnetic recording medium according to claim 1, wherein each of said first and second seed layers has a B2 structure.

6. The magnetic recording medium according to claim 5, wherein each of said first and second seed layers is formed of alloy containing Al and Ru.

7. A magnetic recording/reproducing device comprising:
a magnetic head for reading/writing data from/to a magnetic recording medium having a plurality of tracks; and
an actuator for moving said magnetic head across said tracks of said magnetic recording medium;
said magnetic recording medium comprising:
a substrate;
a first seed layer provided on said substrate, said first seed layer being composed of grains growing in a first direction;
a second seed layer provided on said first seed layer, said second seed layer being formed of the same composition of materials as that of said first seed layer, said second seed layer being composed of grains growing in a second direction tilted with respect to the first direction; and
a plurality of crystal layers provided on said second seed layer and including a magnetic recording layer;
wherein a normal to a crystal lattice plane preferentially oriented in a given direction in each grain composing one of said first and second seed layers is inclined from a normal to the upper surface of said substrate.

* * * * *